(12) United States Patent
Chen et al.

(10) Patent No.: US 12,002,981 B2
(45) Date of Patent: Jun. 4, 2024

(54) BATTERY PACK

(71) Applicant: Contemporary Amperex Technology Co., Limited, Ningde (CN)

(72) Inventors: Xingdi Chen, Ningde (CN); Kaijie You, Ningde (CN); Peng Wang, Ningde (CN); Yongguang Wang, Ningde (CN); Zequan Lu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 2 days.

(21) Appl. No.: 16/838,064

(22) Filed: Apr. 2, 2020

(65) Prior Publication Data

US 2021/0066679 A1 Mar. 4, 2021

(30) Foreign Application Priority Data

Aug. 27, 2019 (CN) .......................... 201910794301.9

(51) Int. Cl.
*H01M 50/26* (2021.01)
*H01M 50/211* (2021.01)
(Continued)

(52) U.S. Cl.
CPC ....... *H01M 50/262* (2021.01); *H01M 50/211* (2021.01); *H01M 50/271* (2021.01); *H01M 50/291* (2021.01); *H01M 2220/20* (2013.01)

(58) Field of Classification Search
CPC ............. H01M 50/20; H01M 2220/20; H01M 50/691; H01M 50/572; Y02E 60/10
See application file for complete search history.

(56) References Cited

U.S. PATENT DOCUMENTS

| 5,392,873 A * | 2/1995 | Masuyama | B60L 50/66 |
| | | | 180/68.5 |
| 8,795,867 B2 | 8/2014 | Kim | |

(Continued)

FOREIGN PATENT DOCUMENTS

| CN | 102104122 A | 6/2011 |
| CN | 102463881 A | 5/2012 |

(Continued)

OTHER PUBLICATIONS

Extended European Search Report issued in European Application No. 20166001.6, dated Jan. 29, 2021, 8 pages.

(Continued)

*Primary Examiner* — Michael L Dignan
(74) *Attorney, Agent, or Firm* — STERNE, KESSLER, GOLDSTEIN & FOX P.L.L.C.

(57) ABSTRACT

A battery pack for optimizing the structure of the battery pack includes a case, a battery module and a blocking member. The case includes an accommodating cavity and a drain hole in communication with the accommodating cavity. The battery module is contained inside the accommodating cavity. The blocking member is mounted to the case, wherein the blocking member is disposed on one side of the battery module in a width direction. At least a part of the blocking member is arranged between the battery module and the drain hole to block a binder for fixing the battery module from entering the drain hole. The reservoir cavity is provided, such that the liquid flow into a reservoir portion to prevent dangers such as short-circuit occurring in the battery module when liquid is accumulated inside the case.

12 Claims, 10 Drawing Sheets

(51) Int. Cl.
*H01M 50/262* (2021.01)
*H01M 50/271* (2021.01)
*H01M 50/291* (2021.01)

(56) References Cited

U.S. PATENT DOCUMENTS

| | | | |
|---|---|---|---|
| 2012/0121959 A1* | 5/2012 | Yamada | B60K 1/04 |
| | | | 429/100 |
| 2012/0251848 A1* | 10/2012 | Cho | H01M 50/213 |
| | | | 429/7 |
| 2013/0248263 A1* | 9/2013 | Umetani | B60K 1/04 |
| | | | 180/65.1 |
| 2014/0242425 A1* | 8/2014 | Callahan | H01M 50/3425 |
| | | | 429/56 |
| 2014/0308552 A1 | 10/2014 | Kim et al. | |
| 2016/0003553 A1 | 1/2016 | Campbell | |
| 2016/0126536 A1 | 5/2016 | Cho et al. | |
| 2016/0226036 A1* | 8/2016 | Kim | H01M 50/502 |
| 2018/0287111 A1* | 10/2018 | Fukuoka | H01M 4/04 |
| 2018/0294503 A1* | 10/2018 | Hoefler | H01M 10/0481 |
| 2018/0337377 A1* | 11/2018 | Stephens | B60K 1/04 |
| 2019/0081372 A1* | 3/2019 | Capati | H01M 50/20 |
| 2019/0372182 A1 | 12/2019 | Takayasu | |
| 2020/0075907 A1* | 3/2020 | Shimazaki | B60L 50/64 |
| 2020/0185672 A1* | 6/2020 | Seo | H01M 10/6557 |

FOREIGN PATENT DOCUMENTS

| | | | | |
|---|---|---|---|---|
| CN | 104051684 A | | 9/2014 | |
| CN | 105140592 A | | 12/2015 | |
| CN | 205211817 U | | 5/2016 | |
| CN | 107887537 A | | 4/2018 | |
| CN | 207409544 | * | 5/2018 | H01M 2/10 |
| CN | 208904093 U | | 5/2019 | |
| EP | 2641764 A2 | | 9/2013 | |
| JP | 2007287494 A | | 11/2007 | |
| KR | 20180112618 A | | 10/2018 | |
| WO | 2018150672 A1 | | 8/2018 | |

OTHER PUBLICATIONS

International Search Report issued in PCT /CN2020/106463, dated Sep. 29, 2020, 6 pages.

* cited by examiner

BATTERY PACK

CROSS-REFERENCE TO RELATED APPLICATION

This application claims priority to Chinese Patent Application No. 201910794301.9 filed Aug. 27, 2019, the disclosures of which are hereby incorporated in their entirety by reference.

FIELD OF THE INVENTION

The present disclosure relates to the field of a battery, and in particular to a battery pack.

DESCRIPTION OF RELATED ART

In order to reduce the environmental pollution by gasoline and the like, batteries are widely applied in vehicles to provide electric drive for vehicles. In order to satisfy the high power requirement of the vehicle, the battery pack is generally used as a power source for the vehicle. The battery pack comprises a battery module, and a case for mounting the battery module, wherein the battery module is mounted inside the case.

The inventors have found that: in the case where there is water accumulated within the case, it is likely to cause short-circuit between the positive and negative electrodes of the battery module.

SUMMARY OF THE INVENTION

The present disclosure proposes a battery pack, for optimizing the structure of the battery pack.

The embodiments of the present disclosure provide a battery pack, comprising:
- a case, comprising an accommodating cavity and a drain hole in communication with the accommodating cavity;
- a battery module contained in the accommodating cavity; and
- a blocking member mounted to the case and being disposed on one side of the battery module in a width direction; wherein at least a part of the blocking member is arranged between the battery module and the drain hole to block a binder for fixing the battery module from entering the drain hole.

In some embodiments, the blocking member is mounted to a wall of the case, and a notch is provided at one end of the blocking member connected to the wall, the notch penetrates the blocking member along a thickness direction of the blocking member; the notch is configured to enable that liquid within the accommodating cavity flows into the drain hole via the notch.

In some embodiments, the notch extends to a side surface of the blocking member connected to the wall.

In some embodiments, the blocking member comprises:
- a first blocking portion fixedly connected to the case;
- a second blocking portion located on one side of the first blocking portion away from the battery module, and fixedly connected to the case;
- wherein the drain hole is located between the first blocking portion and the second blocking portion.

In some embodiments, the first blocking portion and the second blocking portion are both provided with the notch.

In some embodiments, the notch of the first blocking portion and the notch of the second blocking portion are arranged face to face.

In some embodiments, the blocking member further comprises:
- a connection portion, wherein the first blocking portion and the second blocking portion are both disposed at an edge of the connection portion, and the blocking member has a U-shaped cross section.

In some embodiments, the battery pack further comprises:
- a pressure plate fixedly connected to the blocking member, wherein the pressure plate covers a top of the battery module.

In some embodiments, the pressure plate comprises:
- a cover plate located at the top of the battery module; and
- a connecting plate connected to the cover plate and located at one side of the cover plate in a width direction, wherein the connecting plate is detachably connected to the blocking member.

In some embodiments, there are a plurality of the blocking members, and the blocking members are provided on both width sides of the battery module.

In some embodiments, the blocking member and the drain hole are disposed at a wall of the case, and the drain hole is located at the lowermost of the wall.

In some embodiments, a reservoir cavity is provided below the battery module to store a liquid, and in communication with the drain hole; and
- the battery pack further comprises a reservoir portion disposed outside the case; the reservoir portion is provided with the reservoir cavity, or the reservoir portion and the case jointly form the reservoir cavity.

In some embodiments, the reservoir portion is mounted below a wall of the case, such that the reservoir portion is sealingly connected with the wall; wherein the reservoir portion and the wall enclose the reservoir cavity.

In some embodiments, the reservoir portion is provided with an inner concave portion recessed in a direction away from the case.

In some embodiments, comprising a plurality of the drain holes, and the inner concave portion is located outside all of the drain holes and covers all of the drain holes.

In some embodiments, the battery pack further comprises:
- a protection portion mounted on one side of the reservoir portion away from the case, wherein the protection portion has a hardness greater than that of the reservoir portion, and the protection portion entirely covers the reservoir portion.

In the above-described technical solution, the battery pack has a case and a battery module disposed inside an accommodating cavity of the case. During actual use of the battery pack, there might be liquid inside the accommodating cavity of the case. In order to prevent the liquid from contacting the positive and negative electrode terminals of the battery module to cause short-circuit in the battery module, in the above-described technical solution, the case is provided with a drain hole in communication with the accommodating cavity of the case such that the liquid in the accommodating cavity is discharged via the drain hole.

Moreover, in the above-described technical solution, a blocking member is provided between the battery module and the drain hole. A binder is used to fix the battery module. When the binder is in an unsolidified state, the binder flows around when subjected to an external force and self-gravity. Since a blocking member is provided between the battery module and the drain hole, even if the binder flows around, when it flows to the position of the blocking member, it is blocked by the blocking member, so that the flow does not continue. This effectively reduces or even avoids the occurrence of a phenomenon of binder clogging in the drain hole, and ensures that the drain hole drains normally, thereby reducing the occurrence of a short-circuit phenomenon of the battery module caused by the circumstance that there is liquid accumulated inside the case, and improving the performance of the battery pack.

In addition, the blocking member is disposed on an outer side of the battery module in a width direction, and the battery module has a length which is the largest among the three dimensions comprising length, width, and height. The blocking member is disposed on an outer side of the battery module in a width direction, such that the blocking member produces the effect of reducing or even avoiding binder from clogging in the drain hole within a relatively long range.

BRIEF DESCRIPTION OF THE DRAWINGS

The accompanying drawings described herein are used to provide a further understanding of the present disclosure and constitute a part of the present application. The illustrative embodiments of the present disclosure as well as the illustrations thereof, which are used for explaining the present disclosure, do not constitute improper definitions on the present disclosure. In the accompanying drawings.

DESCRIPTION OF THE INVENTION

The technical solution provided by the present disclosure will be described in more detail below in conjunction with FIGS. 1 to 13.

Figure 1:
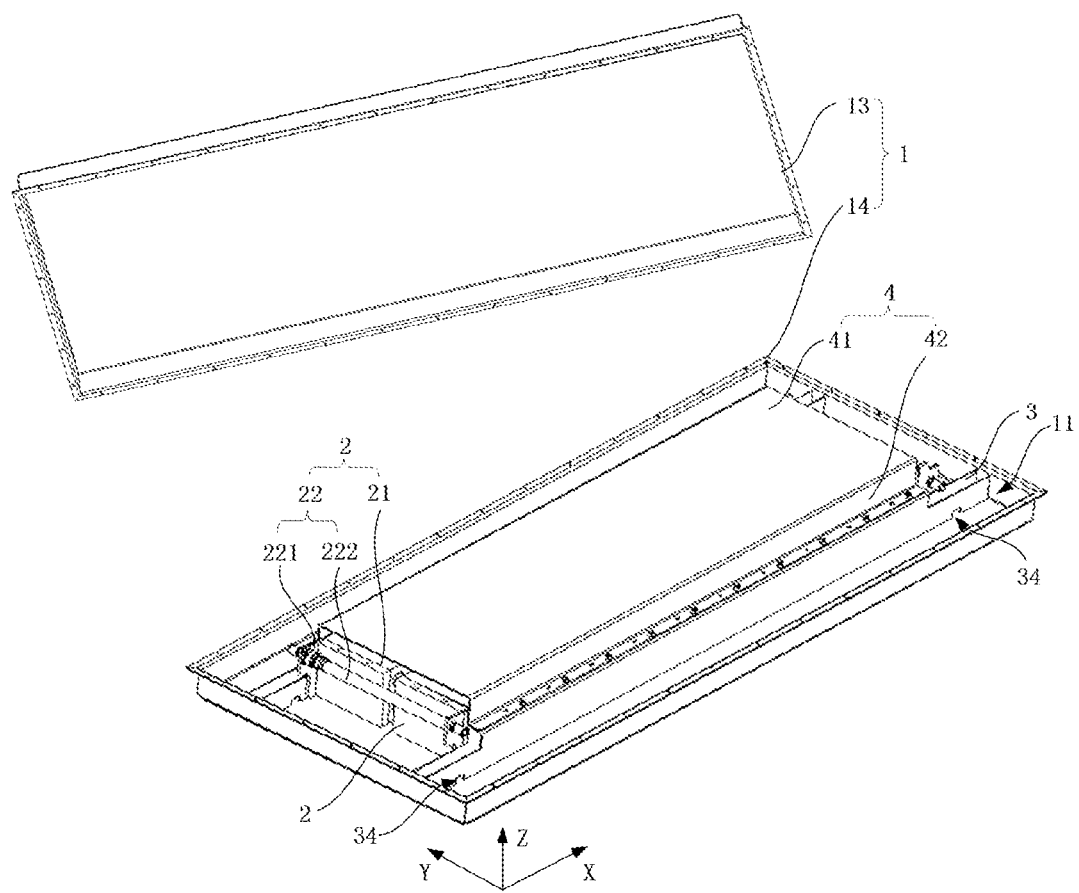
FIG. 1 is a schematic perspective structural view of a partial structure of a battery pack provided by some embodiments of the present disclosure.

In order to more clearly describe the technical solutions of various embodiments of the present disclosure, a coordinate system is established in FIG. 1, and subsequent descriptions of the respective orientations of the battery pack are made based on the coordinate system. Referring to FIG. 1, the X-axis is a length direction of the battery pack. The Y axis is perpendicular to the X axis within a horizontal plane, and the Y axis represents a width direction of the battery pack. The Z axis is perpendicular to a plane formed by the X axis and the Y axis, and the Z axis represents a height direction of the battery module. In the description of the present disclosure, the terms "above" and "below" are both defined relative to the Z-axis direction. The length direction of the case 1 coincides with that of the battery pack, the width direction of the case 1 coincides with that of the battery pack, and the height direction of the case 1 coincides with that of the battery pack.

In the description of the present disclosure, it will be understood that, the azimuth or positional relations indicated by the terms "top", "bottom", "within", "outside", which are based on the azimuth or positional relations illustrated by the drawings, are only for facilitating description of the present disclosure and simplifying the description, rather than indicating or implying that the device or element referred thereto has to present a particular azimuth, and be constructed and operated in a particular azimuth, so that it cannot be understood as limiting the protected content of the present disclosure.

Referring to FIG. 1, the embodiments of the present disclosure provide a battery pack, which comprises a case 1, a battery module 2 and a blocking member 3.

Figure 2:
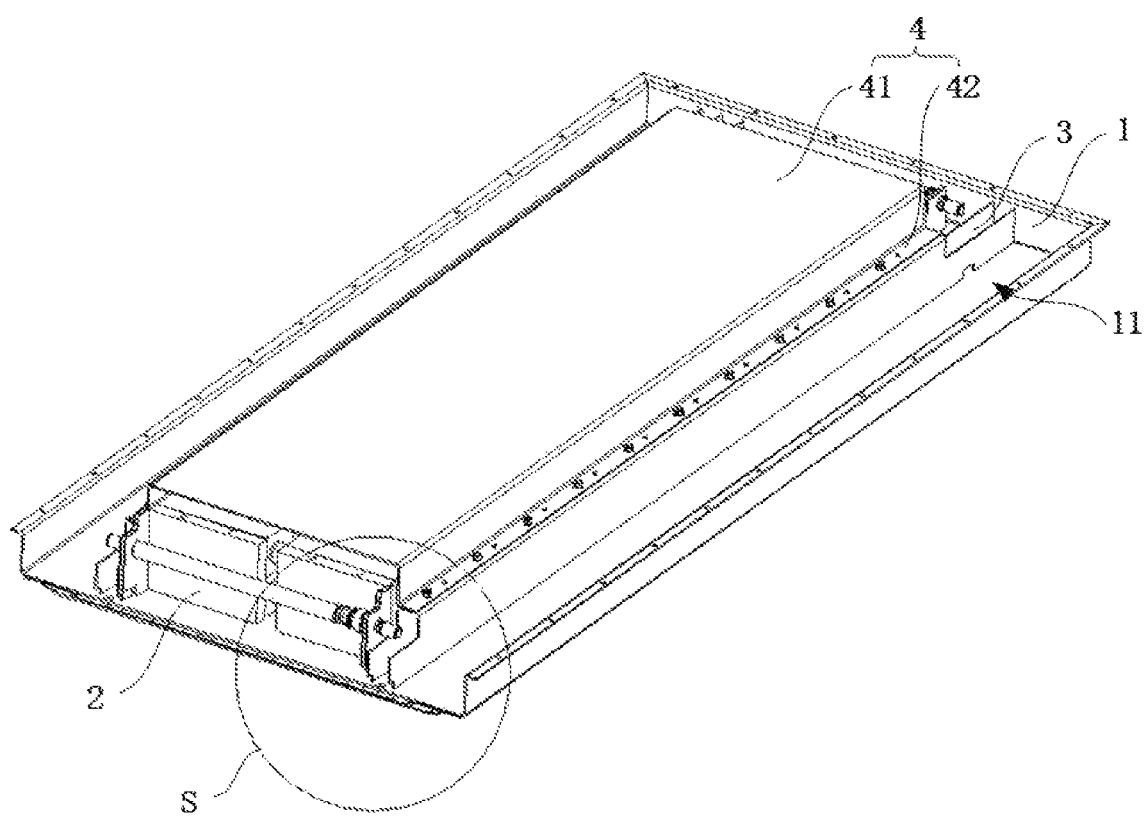
FIG. 2 is a schematic partial perspective structural view of a battery pack provided by some embodiments of the present disclosure.
Figure 3:
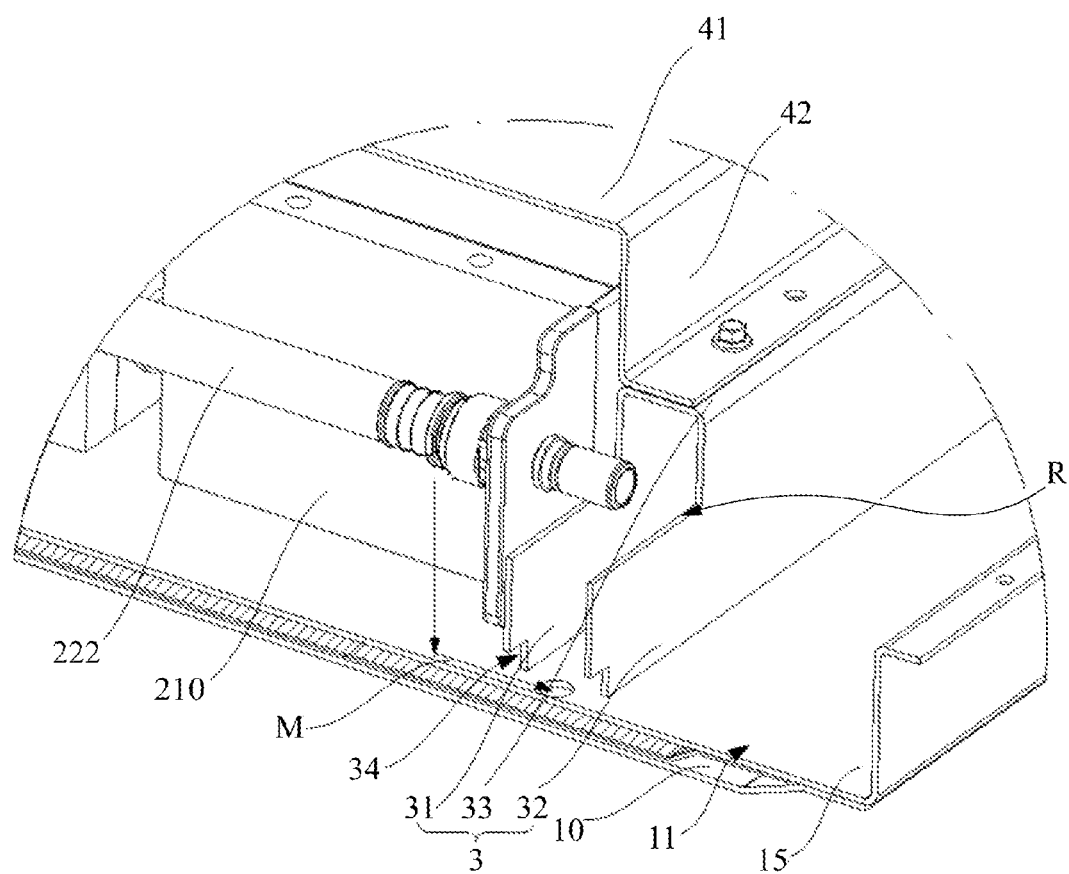
FIG. 3 is a partially enlarged schematic view of S in FIG. 2.

Referring to FIG. 1, FIG. 1 shows a schematic partial perspective structural view of the battery pack, in which the case 1 is in an open state. Referring to FIG. 2, one lateral wall of the second case 14 of the case 1 described later is removed in FIG. 2 to clearly show the structure of the battery module 2 inside the case 1 as well as the positional relationship between the battery module 2 and the second case 14.

Referring to FIGS. 1 to 4, the embodiments of the present disclosure provide a battery pack, which comprises a case 1, a battery module 2 and a blocking member 3. The case 1 comprises an accommodating cavity 11 and a drain hole 12 in communication with the accommodating cavity 11. The battery module 2 is mounted inside the accommodating cavity 11. The blocking member 3 is mounted to the case 1, wherein the blocking member 3 is disposed on one side of the battery module 2 in a width direction. At least a part of the blocking member 3 is arranged between the battery module 2 and the drain hole 12. Wherein, the blocking member 3 is configured to block a binder for fixing the battery module 2 from entering the drain hole 12.

In some embodiments, a reservoir cavity 10 for storing a liquid is provided below the battery module 2, and in communication with the drain hole 12. The term "below" mentioned here is immediately below or obliquely below, as long as the liquid inside the accommodating cavity 11 flows through the drain hole 12 into the reservoir cavity 10 under the effect of gravity.

The reservoir cavity 10 is located inside the case 1, or outside the case 1. In some embodiments, the reservoir cavity 10 is entirely located inside the case 1; in some embodiments the reservoir cavity 10 is entirely outside the case 1. The various implementations will be described specifically later.

In the above-described technical solution, the battery pack is provided with a reservoir cavity 10, which is located below a gravity direction of the battery module 2. If there is liquid accumulated within the accommodating cavity 11, the accumulated liquid flows downward under the effect of gravity, to the drain hole 12, and into the reservoir cavity 10 via the drain hole 12 for storage. It can be seen that, in the above-described technical solution, since the reservoir cavity 10 is disposed below the battery module 2, the short-circuit phenomenon of the battery module 2 caused if there is liquid within the accommodating cavity 11 is reduced or even avoided, thereby improving the operational safety of the battery pack. Moreover, the above-described technical solution is not limited by a placing height of the battery module 2, and in the case of a low height of the battery module 2 and a low position of the electrode terminal thereof, the short-circuit risk of the battery module 2 is also reduced, thereby improving the operational safety of the battery pack.

Further, the blocking member 3 is disposed on both width sides of the battery module 2. The battery module 2 has a substantially rectangular parallelepiped structure. Among the three dimensions comprising length, width and height of the battery module 2, the length dimension is apparently larger than the other two dimensions. The blocking member 3 is disposed on an outer side of the battery module 2 in a width direction, such that the blocking member 3 produces the effect of reducing or even avoiding binder from clogging in the drain hole 12 within a very long range when the binder for fixing the battery module 2 is extended along the width direction of the battery module 2.

Next, the specific implementation of the case 1 will be introduced.

Referring to FIGS. 1 and 4 to 6, in some embodiments, the case 1 comprises a first case 13 and a second case 14. The second case 14 encloses the accommodating cavity 11 with the first case 13, and the second case 14 is located below the first case 13. The drain hole 12 is provided in the second case 14.

The first case 13 and the second case 14 are locked together to form the above-described accommodating cavity 11. In some embodiments, the first case 13 and the second case 14 use other detachable connection means such as bolt connection. That is, the case 1 is formed by a mosaic of two case portions comprising the first case 13 and the second case 14. In some embodiments, the height dimension of the first case 13 is the same as or different from that of the second case 14. In use, the case 1 is formed by a mosaic of two case portions, which on the one hand facilitates mounting, replacing, repairing and servicing various members within the accommodating cavity 11 of the case 1, and on the other hand also makes it easier to manufacture and machine the case 1. Referring to FIG. 1, the case 1 is configured to mount the battery module 2. The case 1 is fixed to the battery module 2 by binder. For example, the case 1 is coated with binder, and then the battery module 2 is placed. After the binder is cured, the battery module 2 is glued to the case 1. By using the above-described implementation, the connection between the battery module 2 and the case 1 is stable and reliable, and the structure of the battery pack is simplified, thereby improving the energy density of the battery pack.

In some embodiments, the second case 14 is unitary, for example molded by integral casting. In some embodiments, the second case is also formed by riveting or welding various members. Referring to FIG. 1, the drain hole 12 described above is provided at the bottom of the second case 14. If there is liquid accumulated inside the accommodating cavity 11, the liquid within the accommodating cavity 11 automatically flows out of the accommodating cavity 11 via the drain hole 12 under the effect of self-gravity, thereby effectuating automatic draining of the liquid accumulated within the accommodating cavity 11.

In other embodiments, the second case 14 comprises a case body and a carrier. The carrier is disposed inside the case body; wherein the carrier divides an inner space of the case 1 into an accommodating cavity 11 and a reservoir cavity 10. The carrier is provided with the drain hole 12, and the drain hole 12 is located at the lowermost of the carrier. The battery module 2 is carried by the carrier; and the blocking member 3 is mounted to the carrier.

In some embodiments, regardless of the structure of the second case 14, the drain hole 12, the battery module 2, and the blocking member 3 are all disposed at the same member. For example, the drain hole 12, the battery module 2, and the blocking member 3 are all disposed at the bottom wall, that is, the wall 15, of the case 1. In some embodiments, the drain hole 12, the battery module 2, and the blocking member 3 are all disposed at the carrier.

The relevant content of the battery module 2 will be introduced below.

Referring to FIGS. 1 to 4, the battery module 2 comprises a battery cell assembly 21 and a cooling system 22. The battery cell assembly 21 comprises a plurality of battery cells 210 arranged side by side. The plurality of battery cells 210 are electrically connected to each other. The cooling system 22 is configured to cool the battery cell assembly 21 of the battery module 2. The cooling system 22 is filled with a liquid for cooling. There might be a leakage phenomenon at the connection of various members of the cooling system 22. The drain hole 12 is configured to discharge the liquid leaked by the cooling system 22, so that there is seldom or even no liquid accumulated inside the case 1, thereby reducing or even eliminating the short-circuit risk of the battery pack.

Figure 4:
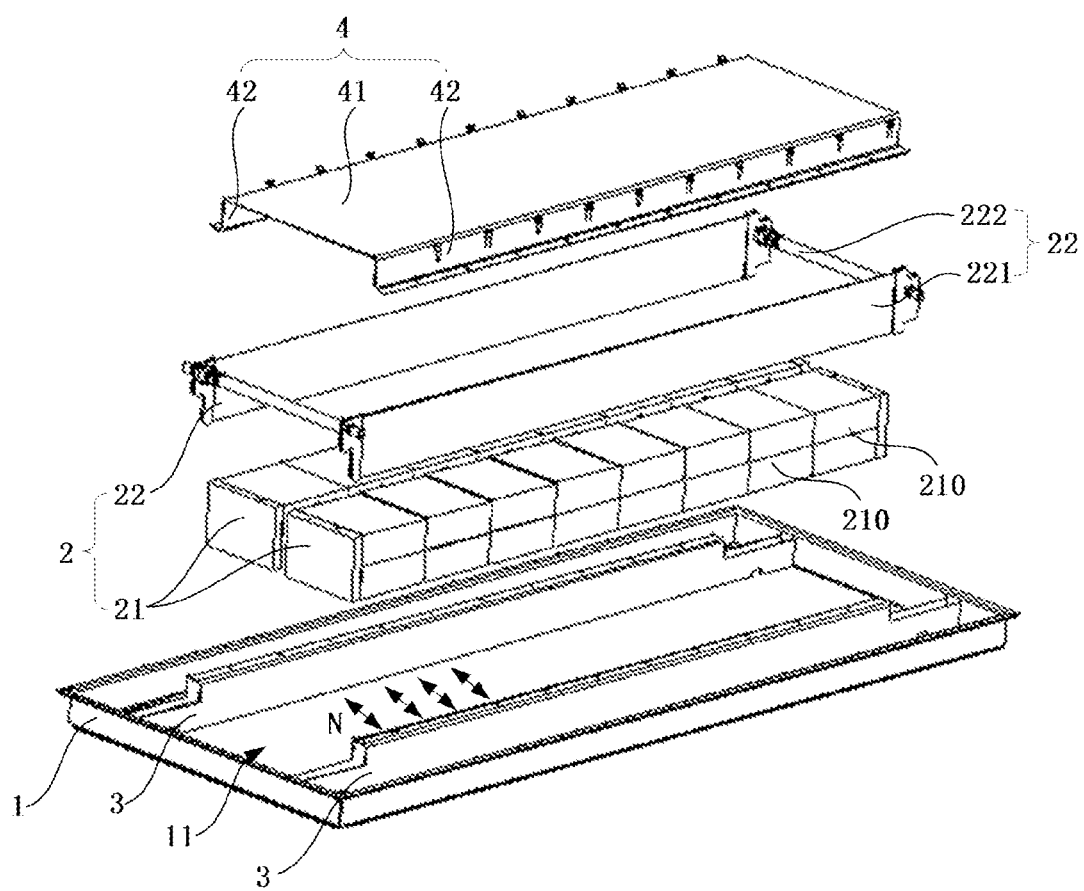
FIG. 4 is a schematic exploded structural view of a battery pack provided by some embodiments of the present disclosure.
Figure 5:
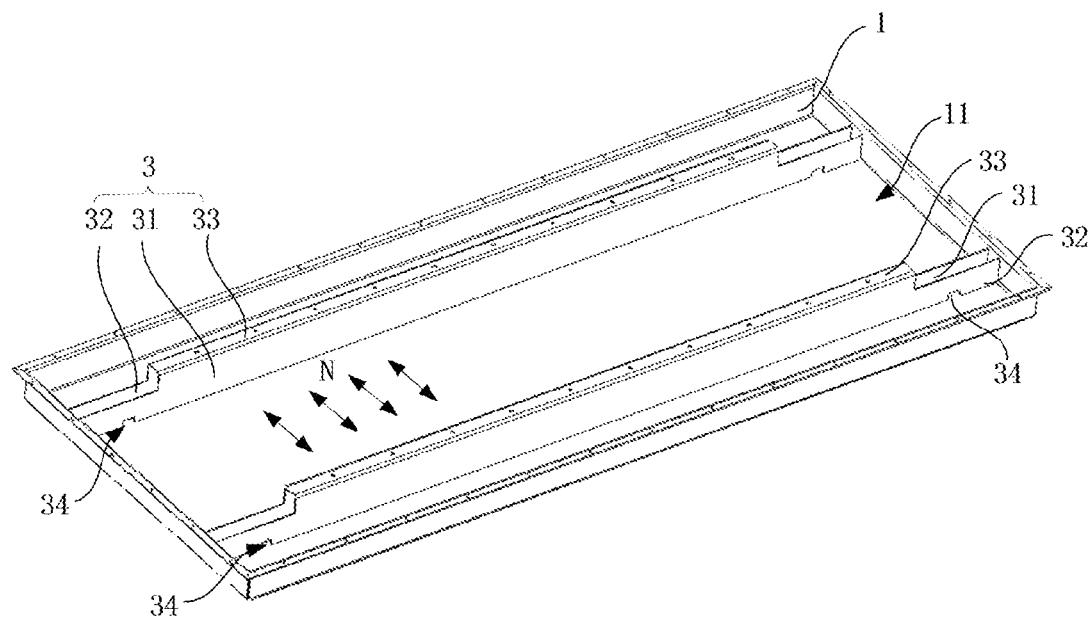
FIG. 5 is a schematic perspective structural view of a case and a blocking member of a battery pack provided by some embodiments of the present disclosure.

Referring to FIGS. 1 and 4, the battery module 2 comprises a plurality of battery cell assemblies 21, which are provided to be connected in series, in parallel or in series and parallel for the electrical connection manner therebetween as necessary, so as to realize the electrical properties required for the battery pack.

Figure 11:
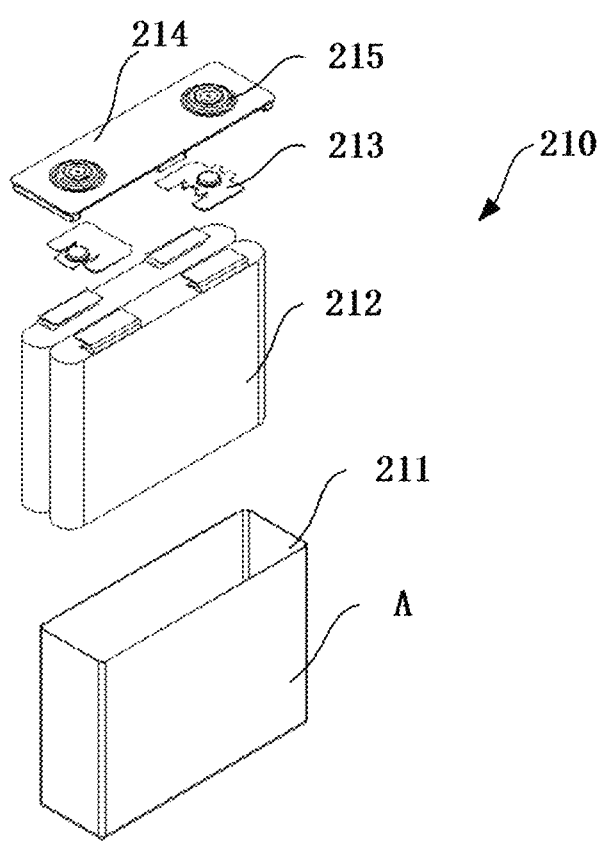
FIG. 11 is a schematic exploded structural view of a battery cell of a battery pack provided by some embodiments of the present disclosure.
Figure 12:
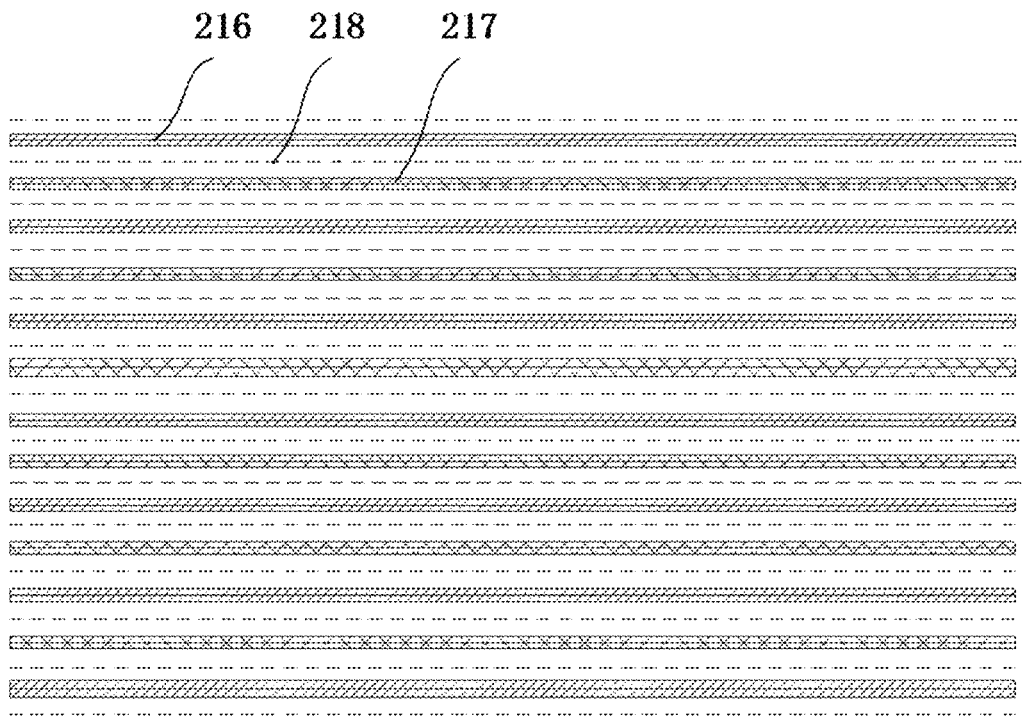
FIG. 12 is a schematic structural view of a laminated electrode assembly.
Figure 13:
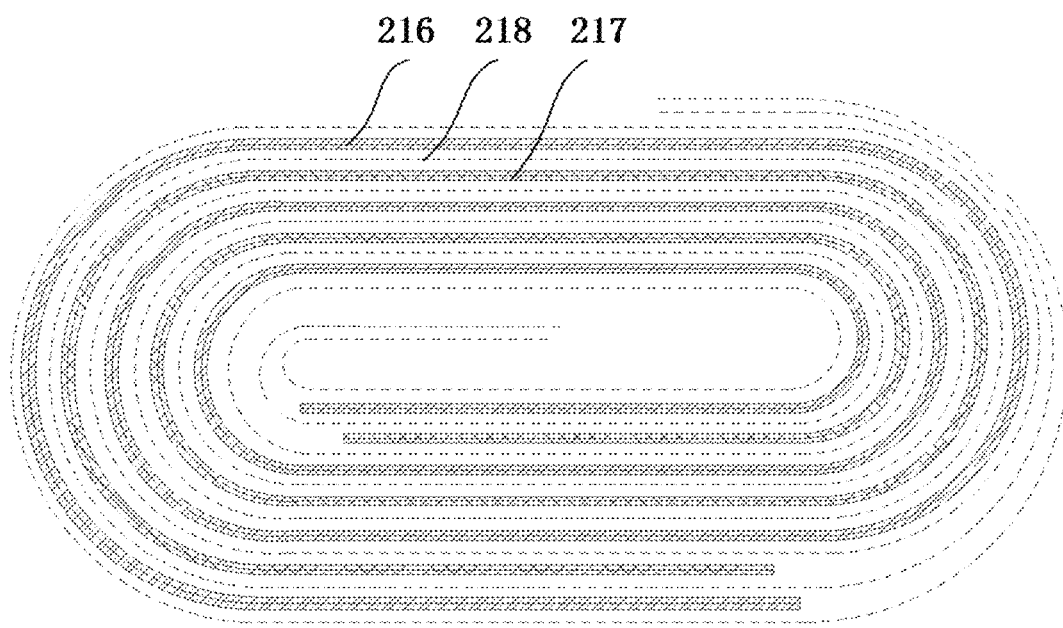
FIG. 13 is a schematic structural view of a wound electrode assembly.

Referring to FIGS. 11 to 13, the structure of the battery cell 210 will be described below.

Referring to FIG. 11, the battery cell 210 comprises a housing 211, an electrode assembly 212 disposed within the housing 211, a connecting member 213 disposed at an end of the electrode assembly 212, and a cover place 214 connected to the housing 211. The cover plate 214 is provided with an electrode terminal 215.

The housing 211 is closed at one end and open at the other end. The cover plate 214 is disposed at an opening of the housing 211. The electrode assembly 212 is mounted to an interior of the housing 211 via the opening. The largest lateral surface of the electrode assembly 212 and that of the housing 211 face to face, and the largest lateral surface of the housing 211 serves as the largest lateral surface A of the battery cell.

The manufacturing manner of the electrode assembly 212 comprises a laminated manner and a wound manner. As shown in FIG. 12, the laminated electrode assembly 212 is to tailor the positive electrode tab 216, the negative electrode tab 217, and the diaphragm 218 into a size having a specified dimension, and subsequently laminate the positive electrode tab 216, the diaphragm 218, and the negative electrode tab 217 into the electrode assembly 212. As shown in FIG. 13, the wound electrode assembly 212 is to wind the positive electrode tab 216, the negative electrode tab 217, and the diaphragm 218 to form a shape.

The maximum surface of the laminated electrode assembly 212 and the wound electrode assembly 212 is the surface having the largest expansion deformation. As shown in FIGS. 1 and 4, the maximum expansion deformation of the battery cell 210 is provided towards the Z-axis direction. It is possible to effectively reduce the accumulated expansion of the battery cell assembly 21 and further reduce the accumulated expansion of the battery pack since the maximum expansion deformation of the battery cell 210 is along the Z-axis direction, and the dimension of the battery module 2 along the Z-axis direction is smaller than the dimension along the X-axis and the Y-axis direction.

Referring to FIGS. 1, 2 and 4, the arrangement manners of the respective battery cells 210 of the battery cell assembly 21 will be introduced below.

Referring to FIGS. 1, 2 and 4, a plurality of battery cells 210 are arranged along a length direction of the case 1, and a largest lateral surface of each of the battery cells 210 and the wall 15 in which the drain hole 12 of the case 1 is located face to face.

Referring to FIGS. 1 and 4, a plurality of battery cells 210 are arranged flat along the length direction X of the case 1. That is, the largest lateral surface A of the battery cell 210 is substantially parallel to the length direction X of the case 1, and the largest lateral surface A of the battery cell 210 and the wall 15 of the case 1 face to face.

As shown in FIG. 1, two rows of battery cell assemblies 21 are provided along a width direction (i.e., the Y-axis direction) of the battery pack. In actual application, three rows or more are also provided. In actual use, one or more layers of battery cell assemblies 21 are also provided in the height direction of the battery pack, that is, in the Z-axis direction in FIG. 1, as necessary.

The placing manner in which the largest lateral surface of the battery cell 210 and the wall 15 of the case 1 face to face is also referred to be laid flat. By using such an arrangement manner as to be laid flat, since the battery cell assembly 21 has a relatively short height in the Z direction, to reduce the overall height of the battery pack, the battery pack having such structure is more suitable for a vehicle having a relatively short space for mounting the battery pack. However, since the battery cell assembly 21 has a short height, the bus bar of the battery cell 210 is also in a low position, and the electrode terminal 215 is relatively closer to the bottom of the case 1. If the structure of the embodiments of the present disclosure is not employed, when there is leakage in the cooling system 22 inside the case 1 or liquid accumulated within the case 1, the battery cell 210 that is laid flat is more likely to be subjected to a short-circuited phenomenon.

If the above-described structure of the embodiments of the present disclosure is employed, the above-described two problems is favorably balanced, so that the battery pack has a relatively short height to meet the vehicle installation requirements; and also the battery pack is less likely to be subjected to a short-circuited phenomenon inside, thereby improving the performance of the battery pack. Since the battery pack has the reservoir portion 5 in communication with the accommodating cavity 11 via the drain hole 12, and the liquid accumulated within the accommodating cavity 11 readily flows out of the accommodating cavity 11 through the drain hole 12, thereby effectively reducing a possibility of a water accumulation phenomenon within the case 1, reducing and even avoiding a possibility of a short-circuit phenomenon in the battery module, and improving the performance and structure of the battery pack.

In addition, by using the above-described arrangement manner, each of the battery cells 210 of the battery module 2 is laid flat. Since the maximum expansion deformation of each of the battery cells 210 comprised in the battery cell assembly 21 is along the Z-axis direction, there is less accumulated expansion of each of the battery cells 210, thereby optimizing the performance of the battery pack.

Referring to FIGS. 1 to 4, the relevant content of the cooling system 22 of the battery module 2 will be introduced below.

The cooling system 22 is disposed outside the battery cell assembly 21. The cooling system 22 abuts against the plurality of battery cells 210 and is configured to cool each of the battery cells 210. Specifically, the cooling system 22 cools a bottom surface of the battery cell assembly 21. The bottom surface of the battery cell assembly 21 refers to a surface of each of the battery cells 210 comprised in the battery cell assembly 21 facing the top surface provided with the electrode terminal 215. Wherein, the drain hole 12 is configured to discharge a liquid leaked by the cooling system 22.

Referring to FIGS. 1 and 4, in some embodiments, two rows of battery cell assemblies 21 share a set of cooling system 22. As shown in FIG. 1, the top surfaces of the two rows of battery cell assemblies 21 provided with the electrode terminals 215 are opposite to each other, and the cooling system 22 is configured to simultaneously cool the bottom surfaces of the two rows of battery cells. In some embodiments, the top surfaces of the two rows of battery cells provided with the electrode terminals 215 are away from each other. The bottom surfaces of each of the battery cells 210 of the two rows of battery cell assemblies 21 are arranged oppositely, with a gap between the two rows of battery cell assemblies 21, and the cooling plate 221 of the cooling system 22 is disposed at the gap to simultaneously cool the bottom surfaces of the two rows of battery cell assemblies 21.

Referring to FIG. 4, in some embodiments, the cooling system 22 comprises a cooling plate 221 and a connecting pipe 222. The cooling plates 21 are internally provided with cooling flow passages, and cooling flow passages have two or more. The cooling plates 221 have two or more. The connecting pipe 222 is connected with the cooling plate 221 to communicate the cooling flow passages of each of the cooling plates 221. Wherein, the drain hole 12 is adjacent to a connection of the cooling plate 221 and the connecting pipe 222.

In some embodiments, a feeding pipe and a draining pipe are additionally provided outside the case 1, and the cooling system 22 is in communication with both the feeding pipe and the draining pipe. The structure realizes the circulation of a coolant inside the cooling system 22, so that there is a favorable cooling effect of the battery pack.

Referring to FIGS. 1 and 4, the cooling system 22 comprises two connecting pipes 222, which are respectively located on both sides of the battery module 2 in a length direction. One or more rows of drain holes 12 are provided below a connection position of each of the connecting pipes 222 and the cooling plate 221. When there is leakage at the connection between the connecting pipe 222 and the cooling plate 221, the drain holes 12 readily drain the accumulated liquid to ensure normal use of the battery module 2 inside the case 1.

Referring to FIGS. 1 to 4, the cooling system 22 is disposed between the two end surfaces of the battery cell assembly 21, that is, one of the two cooling plates 221 of the cooling system 22 cools the bottom surface of one battery cell assembly 21, and the other cooling plate 221 cools the bottom surface of the other battery cell assembly 21. The above-described arrangement implements using one set of cooling system 22, and simultaneously cooling the two battery cell assemblies 21, thereby reducing the number of the cooling members and making a lightweight structure of the battery pack.

Referring to FIG. 1, in some embodiments, the blocking member 3 is located on one side of the cooling plate 221 away from the battery module 2, and the blocking member 3 is provided with an avoidance opening R for avoiding an end of the connecting pipe 222.

Figure 7:
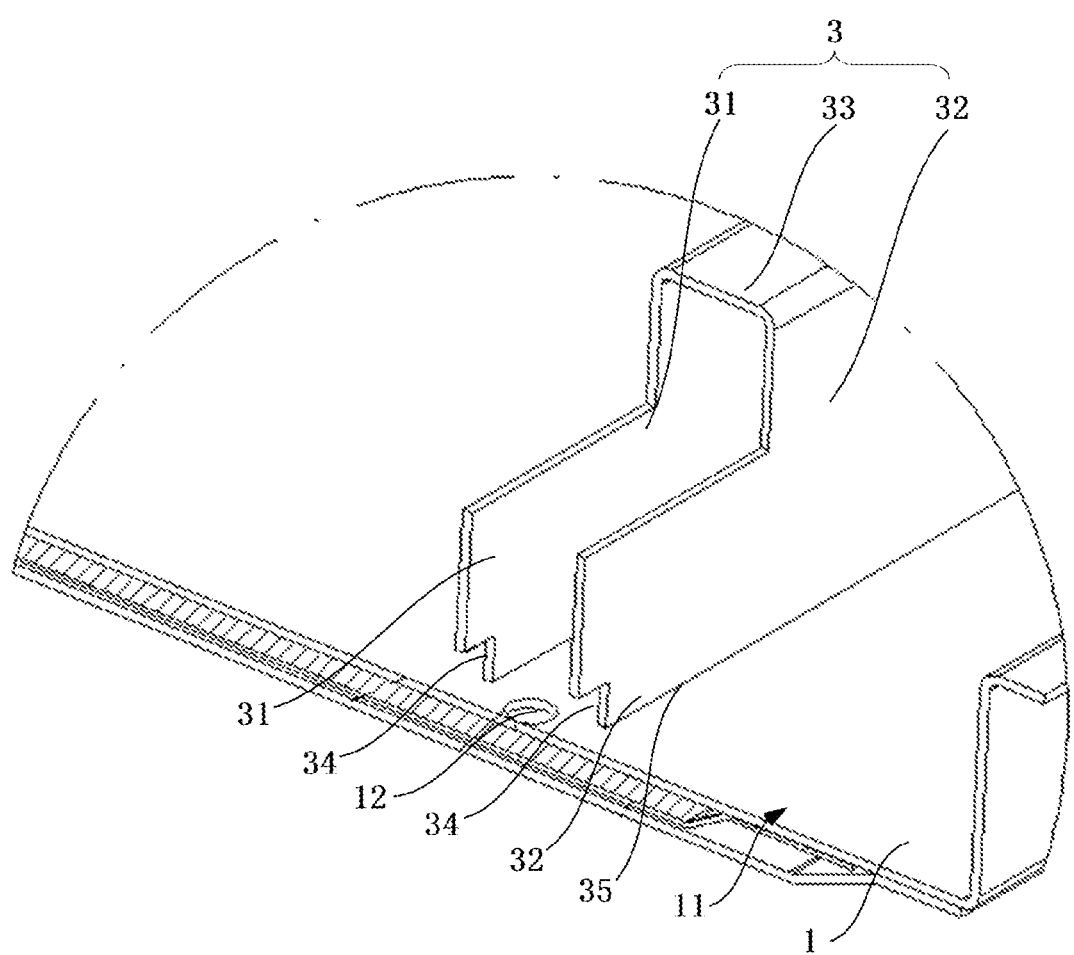
FIG. 7 is a partially enlarged schematic view of B in FIG. 6.
Figure 8:
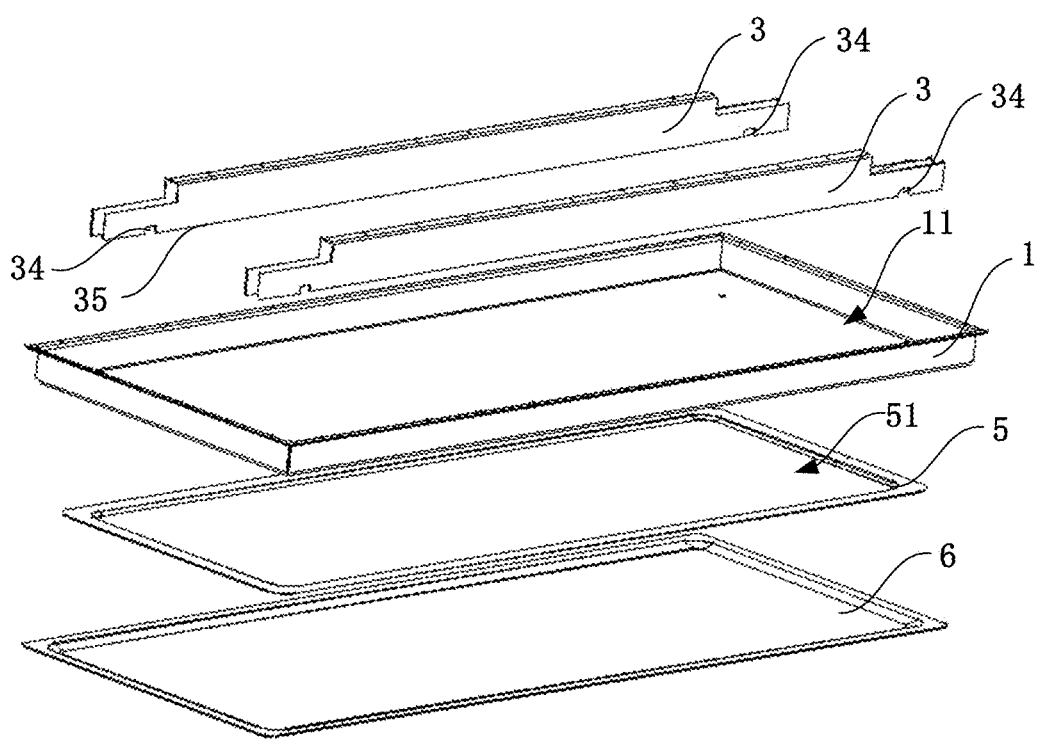
FIG. 8 is a schematic exploded structural view of partial members of a battery pack provided by some embodiments of the present disclosure.
Figure 9:
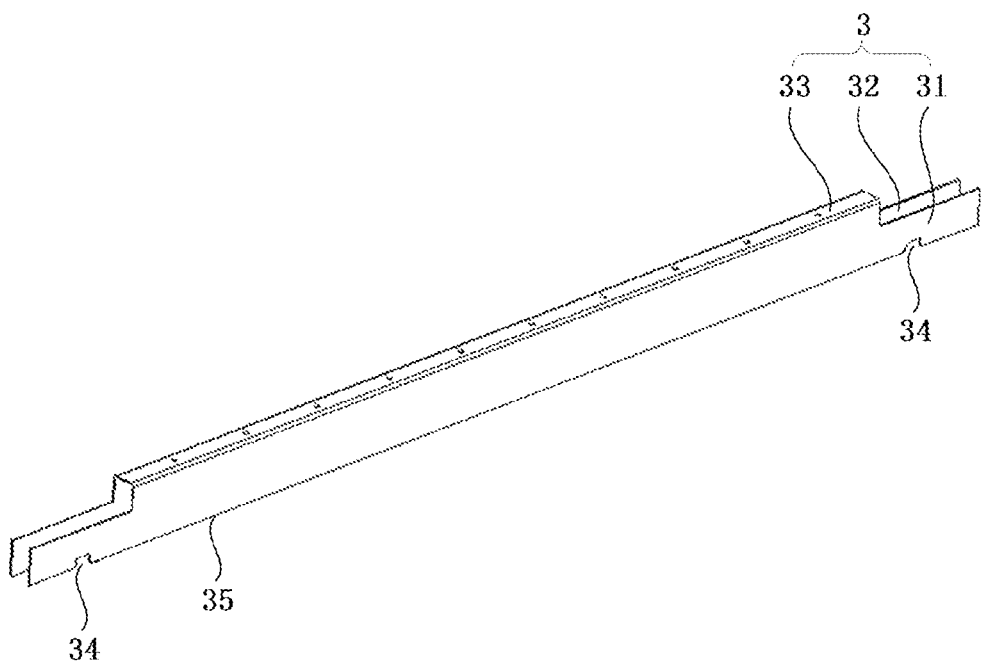
FIG. 9 is a schematic perspective structural view of a blocking member of a battery pack provided by some embodiments of the present disclosure.
Figure 10:
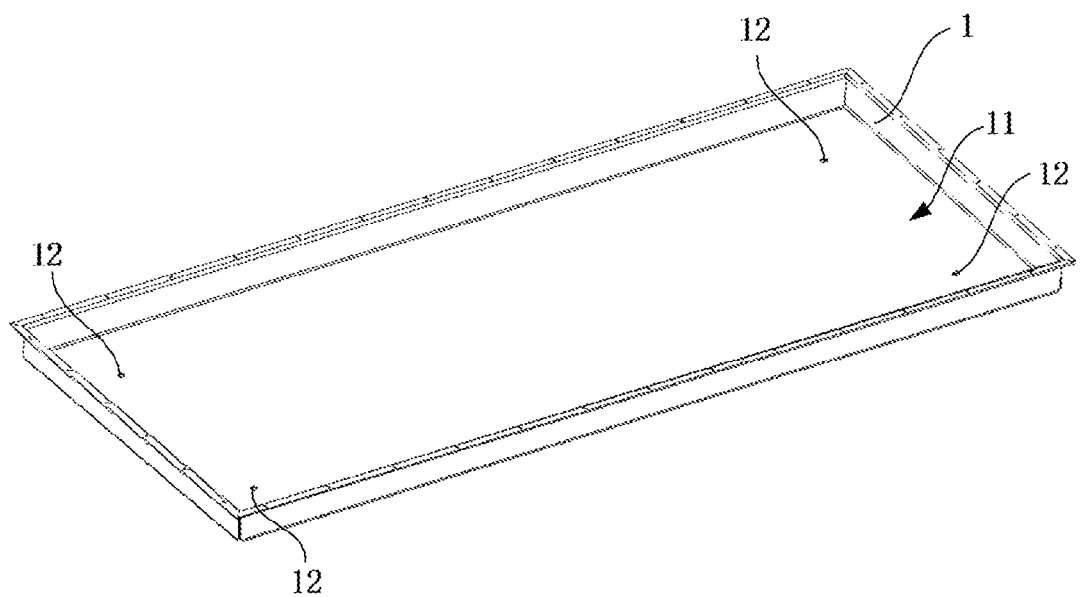
FIG. 10 is a schematic perspective structural view of a case of a battery pack provided by some embodiments of the present disclosure.

Referring to FIG. 1 and FIGS. 7 to 8, the relevant content of the drain hole 12 will be further introduced in detail below.

The battery module 2 is integrally mounted to one of the walls of the case 1, which is referred to as a wall 15. The drain hole 12 is also disposed in the wall 15 of the case 1. Taking the direction shown in FIG. 1 as an example, the wall 15 is the bottom wall of the second case 14. Further, the drain hole 12 is located below a gravity direction of the battery module 2.

In some embodiments, each of the battery cells 210 of the battery module 2 is arranged along a length direction of the case 1, and a largest lateral surface of each of the battery cells 210 and the wall 15 in which the drain hole 12 of the case 1 are located face to face.

Taking the direction shown in FIG. 1 as an example, the drain hole 12 is disposed at the bottom of the case 1, so that the liquid directly flows towards the drain hole 12 under the effect of gravity and then into the reservoir cavity 10 when there is leakage in the cooling system 22 inside the case 1 described later. The flow path of the liquid is illustrated by the path M in FIG. 3. The flow direction of the binder is illustrated by the path N in FIG. 4.

Referring to FIGS. 1 and 7, in some embodiments, four drain holes 12 are arranged at four corners of the case 1, and the drain holes 12 penetrate through the wall 15.

The drain hole 12 is, for example, a circular hole, a trapezoidal hole, an irregular hole, or the like. The shape of the drain hole 12 is not limited, with a function of enabling the accumulated liquid to pass through and smoothly flow into the reservoir cavity 10. The drain hole 12 having a circular hole shape is used to facilitate the machining and manufacturing. The drain hole 12 having a trapezoidal hole is used, and the dimension at one end of the drain hole 12 in communication with the accommodating cavity 11 is greater than the dimension at the other end of the drain hole 12 in communication with the reservoir cavity 10. The structure effectively reduces a possibility of backflow of liquid within the reservoir cavity 10. The drain hole 12 having an irregular hole is used to implement randomly designing the structure, shape and dimension of the drain hole 12 as necessary, so as to satisfy the personalized communicating requirements.

In some embodiments, the drain hole 12 is configured to allow liquid to flow unidirectionally from the drain hole 12 to the reservoir cavity 10. In some embodiments, the drain hole 12 is provided with a direction regulating member that allows liquid to flow unidirectionally from the drain hole 12 to the reservoir portion 5.

In some embodiments, the drain hole 12 is provided in an abnormal structure, or has a dimension at one end greater than the dimension at the other end. In some embodiments, a film that prevents the backflow is provided at an end of the drain hole 12 to prevent the backflow.

In some embodiments, the dimension of the opening at one end of the drain hole 12 in communication with the accommodating cavity 11 is greater than the dimension of the opening at the other end in communication with the reservoir portion 5.

The dimension of the opening at one end of the drain hole 12 in communication with the accommodating cavity 11 is greater than the dimension of the opening at the other end in communication with the reservoir cavity 10. The end having a larger dimension is located upstream of the gravity direction, and the end having a smaller dimension is located downstream of the gravity direction. This structure makes it difficult for the liquid to flow back into the case 1 via the drain hole 12 when the case 1 is inverted.

By the above-described arrangement, after the liquid accumulated within the accommodating cavity 11 of the case 1 flows out into the reservoir cavity 10 via the drain hole 12, the liquid in the reservoir cavity 10 is also less likely to turn around into the accommodating cavity 11 during the use of the battery pack even if there are accidental conditions such as collision and impact, thereby reducing the short-circuit of the battery module 2 resulting from the backflow of the liquid in the reservoir cavity 10 to the accommodating cavity 11, optimizing the structure of the battery pack, and improving the performance of the battery pack.

Referring to FIGS. 1 to 7, the relevant content of the blocking member 3 will be introduced below. There are a plurality of the blocking members 3. The blocking member 3 is provided on every side of the battery module 2 in the width direction.

The blocking member 3 has a length matched to that of the battery module 2. In some embodiments, the blocking member 3 has a length slightly greater than that of the battery module 2. Thus, the blocking member 3 produces a blocking effect in an entire length direction of the battery module 2 to prevent the binder for fixing the battery module 2 from entering the drain hole 12.

It will be understood that, a plurality of blocking members 3 are also provided on one side of the battery module 2 in a width direction, and the plurality of blocking members 3 in a collective mosaic jointly produces a blocking effect in an entire length direction of the battery module 2.

Figure 6:
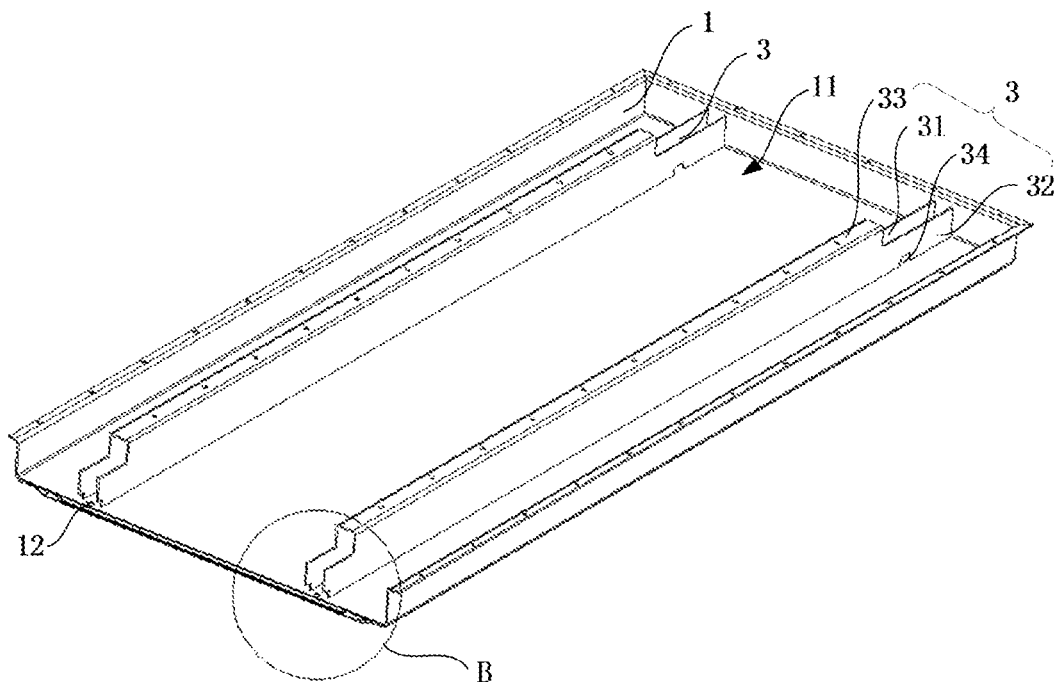
FIG. 6 is a schematic partial structural view of a case and a blocking member of a battery pack provided by some embodiments of the present disclosure.

Referring to FIGS. 1, 6 and 7, in some embodiments, the blocking member 3 is mounted to a wall 15 of the case 1, and a notch 34 is provided at one end of the blocking member 3 connected to the wall 15, such that the notch 34 penetrates the blocking member 3 along a thickness direction of the blocking member 3. The notch 34 is configured to enable that liquid within the accommodating cavity 11 flows into the drain hole 12 via the notch 34. The side surface 35 of the blocking member 3 is connected to the wall 15. The notch 34 functions to allow passage of the liquid inside the case 1. The notch 34 is disposed at an end of the blocking member 3 in a length direction. The position is close to the position where there is liquid leakage, and where binder is less likely to flow here. The position where there is liquid leakage refers to a connection of the connecting pipe 222 and the cooling plate 221 of the cooling system 22 described above.

In some embodiments, the notch 34 extends to the side surface 35 of the blocking member 3 connected to the wall 15. The above-described notch 34 is provided at a lower end of the blocking member 3, such that the lower end of the blocking member 3 is separated from the wall 15. The structure allows the liquid accumulated within the accommodating cavity 11 to enter the drain hole 12 through the notch 34, and the blocking member 3 does not block normal draining operation of the accumulated liquid, thereby ensuring the drying inside the case 1 and effectively reducing a possibility of a short-circuit phenomenon in the battery module 2 inside the case 1 due to liquid accumulation.

Referring to FIGS. 6 and 7, the blocking member 3 specifically adopts the following structure. The blocking member 3 comprises a first blocking portion 31 and a second blocking portion 32. The first blocking portion 31 is fixedly connected to the case 1. The second blocking portion 32 is located on one side of the first blocking portion 31 away from the battery module 2, and fixedly connected to the case 1. Wherein, the drain hole 12 is located between the first blocking portion 31 and the second blocking portion 32, and at least one of the first blocking portion 31 and the second blocking portion 32 is provided with the notch 34. The second blocking portion 32 and the first blocking portion 31 are arranged for example in parallel, and use the same structure. The notch 34 allows the liquid accumulated within the accommodating cavity 11 of the case 1 to smoothly flow to the drain hole 12.

Referring to FIGS. 6 and 7, in some embodiments, the first blocking member portion 31 and the second blocking member portion 32 are both provided with a notch 34. Plural notches 34 are provided, such that the entire internal space of the accommodating cavity 11 is in liquid communication, and liquid accumulated at any site of the accommodating cavity 11 passes through the notch 34 and then flows into the drain hole 12.

In some embodiments, the notch 34 of the first blocking portion 31 and the notch 34 of the second blocking portion 32 are arranged in a face-to-face fashion. The notch 34 of the first blocking portion 31 and the notch 34 of the second blocking portion 32 form a mutually penetrating passage, and the liquid accumulated within the accommodating cavity 11 smoothly flows to the drain hole 12 whether from the notch 34 of the first blocking portion 31 or the notch 34 of the second blocking portion 32.

Referring to FIGS. 6 and 7, the blocking member 3 further comprises a connection portion 33. The connection portion 33 is fixedly connected to both the first blocking portion 31 and the second blocking portion 32. The first blocking portion 31 and the second blocking portion 32 are both disposed at an edge of the connection portion 33. Wherein, the drain hole 12 is located between the first blocking portion 31 and the second blocking portion 32.

Specifically, the first blocking portion 31 and the second blocking portion 32 are both disposed at an edge of the connection portion 33, and integrally form a beam structure having a U-shaped cross section. The U-shaped beam structure not only functions to prevent the binder from clogging the drain hole 12, but also enhances the rigidity and hardness of the case 1 so that the structure of the battery pack is more stable.

The blocking member 3 and the drain hole 12 are disposed at the same wall 15 of the case 1, and the drain hole 12 is located at the lowermost of the wall 15. Since the drain hole 12 is located at the lowermost of the wall 15, if there is liquid accumulated inside the accommodating cavity 11 of the case 1, the liquid flows into the drain hole 12 under the effect of self-gravity. Even if the blocking member 3 produces a certain blocking effect, the above-described arrangement also enables a better draining effect in the drain hole 12.

Still referring to FIGS. 1 to 4, the relevant content of the pressure plate 4 will be introduced below.

The battery pack further comprises a pressure plate 4 fixedly connected to the blocking member 3, wherein the pressure plate 4 covers a top of the battery module 2. After the pressure plate 4 is installed in position, it functions to press the top of the battery module 2. The top of the battery module 2 refers to a top surface of the battery module 2 situated in a Z direction in FIG. 1. This surface is subjected to a maximum deformation during use of the battery pack. The pressure plate 4 presses the top surface such that the top surface is not excessively deformed. The pressure plate 4 is independent of the case 1, and the pressure plate 4 is located inside the accommodating cavity 11 of the case 1. The pressure plate 4 is not connected to the first case 13. There is a certain gap between the pressure plate 4 and the first case 13 to reserve an expansion space, thereby preventing deformation of the first case 13 under the effect of an expansion force of the battery module 2. During the installation, after the battery module 2 is installed in position, the pressure plate 4 is mounted, and then the first case 13 of the case 1 and the second case 14 are locked together.

Specifically, the pressure plate 4 comprises a cover plate 41 and a connecting plate 42. The cover plate 41 is located at the top of the battery module 2. The cover plate 41 is a flat plate. A connecting plate 42 is fixedly provided at an edge of the cover plate 41 in a width direction, such that connecting plate 42 is detachably connected to the blocking member 3. The connecting plate 42 is, for example, a folded plate provided with a threaded hole in a folded edge, such as to be detachably connected to the connection portion 33 of the blocking member 3 through the threaded hole. The number of the threaded holes is one or more rows, and the number of each row is not limited.

In some embodiments, the cover plate 41 is integral with the connecting plate 42. Specifically, for example, a metal plate is folded to form the pressure plate 4.

Divided according to the position of the reservoir cavity 10, the reservoir cavity 10 is located inside or outside the case 1, or partially inside the case 1, and partially outside the case 1. The reservoir cavity 10 does not communicate with the exterior of the battery pack to prevent external liquid or moisture from flowing into the interior of the accommodating cavity 11 via the reservoir cavity 10, thereby ensuring the safety performance of the battery pack.

Referring to FIGS. 1 to 4 and 8, the implementations of the reservoir cavity 10 located outside the case 1 will first be introduced below.

In the embodiments shown in FIG. 1, the battery pack further comprises a reservoir portion 5 disposed outside the case 1. The reservoir portion 5 is provided with the reservoir cavity 10, or the reservoir portion 5 and the case 1 jointly form the reservoir cavity 10.

Referring to FIG. 1, the reservoir portion 5 is located outside the bottom of the case 1, and the reservoir portion 5 and the wall 15 of the case 1 are fixed together.

When the reservoir portion 5 is separately provided with the reservoir cavity 10, the reservoir portion 5 and the case 1 are also sealingly connected therebetween, so that the reservoir cavity 10 communicates with the drain hole 12, and there is no liquid leakage from the connection between the reservoir portion 5 and the case 10. The manner of implementing sealingly connecting the reservoir portion 5 and the case 1 is for example in a way such that both of them are sealingly connected directly, or for example to implement a sealed connection by providing the sealing structures that are mated with each other. In some embodiments, a sealing member is sandwiched between the reservoir portion 5 and the case 1, such that the reservoir portion 5 is sealingly connected to the case 1 by the sealing member.

When the reservoir portion 5 and the case 1 jointly form the reservoir cavity 10, the reservoir portion 5 and the case 1 are also sealingly connected. There are multiple sealed connection manners. One alternative manner is that the reservoir portion 5 is sealingly connected to the case 1 directly. Another manner is that a sealing member is sandwiched between the reservoir portion 5 and the case 1, such that the reservoir portion 5 is sealingly connected to the case 1 by the sealing member. The sealing member is, for example, a sealing ring or the like. In the above-described implementation, the reservoir portion 5 is sealingly connected to the case 1, so that the liquid within the accommodating cavity 11 does not leak via the connection between the reservoir portion 5 and the case 1, thereby improving the performance of the battery pack. Moreover, external liquid and moisture does not flow into the interior of the accommodating cavity 11 via the reservoir cavity 4, thereby ensuring the safety performance of the battery pack.

The above-described introduction, if the reservoir cavity 10 is formed outside the case 1, the wall 15 and other portions of the second case 14 (i.e., the side walls of the second case 14) are sealingly connected or not. The entire case 14 is sealed mainly by the reservoir portion 4 to prevent foreign moisture and liquid from entering the case 1. It is due to the above-described plural possibilities in the connection relationship between the wall 15 and other portions of the second case 14, that the second case 14 is integrally molded, and also has a split structure, for example formed by welding or riveting a plurality of plates.

As known from the above-described introduction, when located outside the case 1, the reservoir portion 5 forms the reservoir cavity 10 in the following two manners:

Some implementations are that the reservoir portion 5 itself has a structure of a closed cavity which has an inflow port in communication with the drain hole 12. The closed cavity serves as the reservoir cavity 10. In the above-described technical solution, the reservoir portion 5 is a separate member, and separately forms the reservoir cavity 10. At the time of installation, the reservoir portion 5 is sealingly fixed to the case 1, such that the reservoir cavity 10 communicates with the drain hole 12 to prevent leakage of liquid from the drain hole 12 to an area other than the reservoir cavity 10.

Other implementations are that: the reservoir portion 5 and the case 1 jointly form the reservoir cavity 10.

In some embodiments, the reservoir portion 5 is mounted below a wall 15 of the case 1, such that the reservoir portion 5 is sealingly connected with the wall 15; wherein the reservoir portion 5 and the wall 15 enclose the reservoir cavity 10.

If the reservoir portion 5 and the wall 15 jointly form the reservoir cavity 10, the sealed connection manner of the reservoir portion 5 and the wall 15 is similar to the sealed connection method introduced above, and thus will not be described in detail here. In the above-described implementation, the reservoir portion 5 is sealingly connected to the wall 15, so that the liquid within the accommodating cavity 11 does not leak via the connection between the reservoir portion 5 and the wall 15, thereby improving the performance of the battery pack.

Further, the reservoir portion 5 is provided with an inner concave portion 51 recessed in a direction away from the case 1. Referring to FIGS. 1 and 8, the reservoir portion 5 is provided with an inner concave portion 51, which encloses the reservoir cavity 10 with the wall 15.

In some embodiments, the inner concave portion 51 is for example plural, and a plurality of inner concave portions 51 jointly cover all of the drain holes 12.

In some embodiments, the inner concave portions 51 are located outside all of the drain holes 12. That is, the inner concave portions 51 entirely cover all of the drain holes 12, so that the liquid within the drain hole 12 entirely flows to the reservoir cavity 10.

The inner concave portion 51 provided in one of the reservoir portions 5 is, for example, plural, and a plurality of inner concave portions 51 of the same reservoir portion 5 are in communication or not in communication.

In some embodiments, the material of the reservoir portion 5 comprises plastic. The plastic material which has a favorable deformation property, effectively absorbs energy, and reduces a possibility of a sealing failure when subjected to a collision.

In some embodiments, the volume of the reservoir cavity 10 is greater than or equal to the capacity of the coolant in the cooling system 22. If the above-described arrangement causes a very serious leakage in the cooling system 22, the battery module 2 will not be soaked in the liquid as well, thereby enhancing the operational safety of the battery pack.

In some embodiments, the battery pack further comprises a protection portion 6 mounted on one side of the reservoir portion 5 away from the case 1.

The protection portion 6 is, for example, a plate-like structure provided with an inner concave structure mated with the inner concave portion 51 of the reservoir portion 5, so as to entirely wrap the outside of the reservoir portion 5, thereby reducing a possibility of failure of the reservoir portion 5 due to collision. The protection portion 6 is configured to protect the reservoir portion 5, to prevent that the reservoir portion 5 is deformed and damaged due to collision.

In some embodiments, the protection portion 6 has a hardness higher than that of the reservoir portion 5. The protection portion 6 entirely covers the reservoir portion 5.

Specifically, the protection portion 6 has a hardness greater than that of the reservoir portion 5, and the protection portion 6 entirely covers the reservoir portion 5.

Next, a specific implementation of the reservoir cavity 10 formed inside the case 1 will be described.

The case 1 comprises a case body and a carrier disposed inside the case body. The carrier divides the internal space of the case 1 into the accommodating cavity 11 and the reservoir cavity 10. The carrier is provided with a drain hole 12, and the battery module 2 is mounted on the carrier. Both the blocking member 3 and the battery module 2 are mounted to the carrier 142, and the drain hole 12 is also disposed in the carrier 142. For the structure of the blocking member 3, please refer to the above introduction, which will not be described in detail here. When the reservoir cavity 10 is formed inside the case 1, the case 1 itself is required to be hermetic, such that foreign moisture and liquid cannot enter the case 1.

The carrier is, for example, flat shaped. The carrier is welded or bolted to the inner wall of the case 1. The above-described structure makes a more compact and lightweight structure of the battery pack.

The functions of the accommodating cavity 11 and the reservoir cavity 10 are the same as those introduced above. The accommodating cavity 11 is configured to mount the battery module 2. The reservoir cavity 10 is configured to store liquid leaking from the accommodating cavity 11. Please refer to the above-described for other content.

In some embodiments, a bottom of the case body is provided with an inner concave area recessed in a direction away from the first case 13, and the carrier is connected with an edge of the inner concave area. The above-described arrangement is used to simplify the machining, and make a stable and reliable structure of the reservoir cavity 10.

The exterior of the reservoir cavity 10 is provided with a protection portion 6 for covering the outer wall of the reservoir cavity 10.

The protection portion 6 has a hardness higher than that of the outer wall of the reservoir cavity 10. The protection portion 6 is configured to protect the outer wall of the reservoir cavity 10 to reduce a possibility of a leakage risk of the reservoir cavity 10 in the event of a collision or the like, and to ensure normal use of the battery pack.

It is understood that, in the above-described various embodiments, as long as they are not contradictory, it is possible to refer to or combine the relevant content of the remaining embodiments, so as to implement that the reservoir cavity 10 is partially located inside the case 1 and partially located outside the case 1.

Finally, it should be noted that the above embodiments are only used to illustrate the technical solutions of the present disclosure rather than limiting the same; although the present disclosure has been described in detail with reference to the foregoing embodiments, those skilled in the art should understand that, they may still amend the technical solutions recited in the foregoing various embodiments, or make equivalent replacement to partial technical features therein. However, such amendments or replacements do not make the essence of the corresponding technical solutions depart from the spirit and scope of the technical solutions of the various embodiments of the present disclosure.

What is claimed is:

1. A battery pack, comprising:
   a case (1), comprising an accommodating cavity (11) and a drain hole (12) in communication with the accommodating cavity (11);
   a battery module (2) contained in the accommodating cavity (11), wherein the battery module (2) comprises a battery cell assembly (21) and a cooling system (22), wherein the battery cell assembly (21) comprises a plurality of battery cells (210) arranged side by side and electrically connected to each other, wherein the cooling system (22) is configured to cool the battery cell assembly (21) of the battery module (2) and comprises a cooling plate (221) and a connecting pipe (222), and wherein the drain hole (12) is adjacent to a connection of the cooling plate (221) and the connecting pipe (222);
   a blocking member (3) mounted to the case (1) and being disposed on one side of the battery module (2) in a width direction, wherein at least a part of the blocking member (3) is arranged between the battery module (2) and the drain hole (12) to block a binder for fixing the battery module (2) from entering the drain hole (12);
   a pressure plate (4) fixedly connected to the blocking member (3), wherein the pressure plate (4) comprises a cover plate (41), and covers the battery module (2);
   a reservoir cavity (10) provided below the battery module (2) to store a liquid, such that the reservoir cavity (10) is in communication with the drain hole (12), wherein the drain hole (12) is configured to allow liquid to flow unidirectionally from the drain hole (12) to the reservoir cavity (10),
   wherein the blocking member (3) and the drain hole (12) are disposed at a bottom wall (15) of the case (1),
   wherein the pressure plate (4) is configured to constrain the deformation of the battery module (2),
   wherein there is a gap between the cover plate (41) of the pressure plate (4) and the case,
   wherein the blocking member (3) comprises:
      a first blocking portion (31) fixedly connected to the case (1); and
      a second blocking portion (32) located on one side of the first blocking portion (31) away from the battery module (2), and fixedly connected to the case (1), and
   wherein the drain hole (12) is located between the first blocking portion (31) and the second blocking portion (32), and at least one of the first blocking portion (31) and the second blocking portion (32) is provided with a notch (34);
   a reservoir portion (5) disposed outside the case (1), wherein the reservoir portion (5) is provided with the reservoir cavity (10), or the reservoir portion (5) and the case (1) jointly form the reservoir cavity (10); and
   a protection portion (6) mounted on one side of the reservoir portion (5) away from the case (1), wherein the protection portion (6) has a hardness greater than that of the reservoir portion (5), and the protection portion (6) entirely covers the reservoir portion (5).

2. The battery pack according to claim 1, wherein a notch (34) is provided at one end of the blocking member (3) connected to the bottom wall (15), the notch (34) penetrates the blocking member (3) along a thickness direction of the blocking member (3), and the notch (34) is configured to enable that liquid within the accommodating cavity (11) flows into the drain hole (12) via the notch (34).

3. The battery pack according to claim 2, wherein the notch (34) extends to a side surface (35) of the blocking member (3) connected to the bottom wall (15).

4. The battery pack according to claim 3, wherein the first blocking portion (31) and the second blocking portion (32) are both provided with the notch (34).

5. The battery pack according to claim 4, wherein the notch (34) of the first blocking portion (31) and the notch (34) of the second blocking portion (32) are arranged face to face.

6. The battery pack according to claim 3, wherein the block member (3) further comprises a connection portion (33), wherein the first blocking portion (31) and the second blocking portion (32) are both disposed at an edge of the connection portion (33), and wherein the blocking member (3) has a U-shaped cross section.

7. The battery pack according to claim 1, wherein the pressure plate (4) comprises:
   a connecting plate (42) connected to the cover plate (41) and located at one side of the cover plate (41) in a width direction, wherein the connecting plate (42) is detachably connected to the blocking member (3).

8. The battery pack according to claim 1, wherein there are a plurality of the blocking members (3), and the blocking members (3) are provided on both width sides of the battery module (2).

9. The battery pack according to claim 1, wherein the drain hole (12) is located at the lowermost of the bottom wall (15).

10. The battery pack according to claim 9, wherein the reservoir portion (5) is mounted below the bottom wall (15) of the case (1), such that the reservoir portion (5) is sealingly connected with the bottom wall (15), wherein the reservoir portion (5) and the bottom wall (15) enclose the reservoir cavity (10).

11. The battery pack according to claim 9, wherein the reservoir portion (5) is provided with an inner concave portion (51) recessed in a direction away from the case (1).

12. The battery pack according to claim 11, comprising a plurality of the drain holes (12), wherein the inner concave portion (51) is located outside all of the drain holes (12) and covers all of the drain holes (12).

\* \* \* \* \*